Nov. 29, 1938.  C. W. HALLER  2,138,490
ROTARY INTERNAL COMBUSTION ENGINE
Original Filed Jan. 22, 1935   2 Sheets-Sheet 1
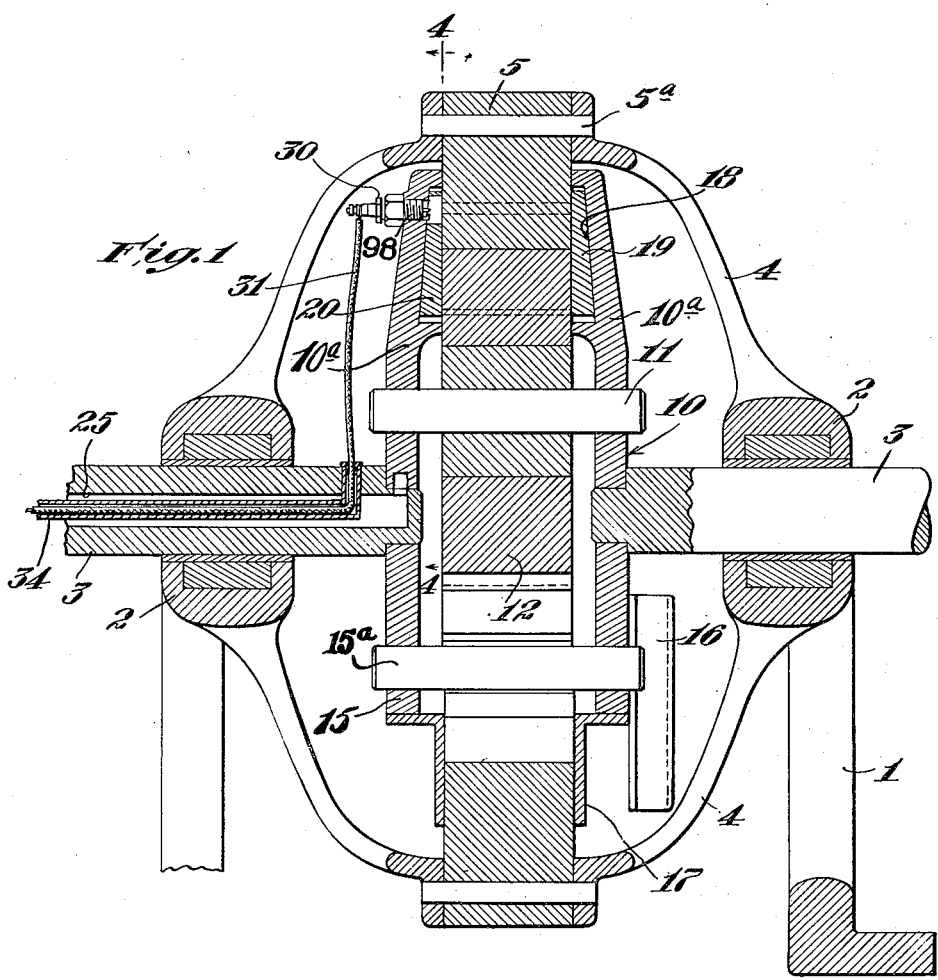
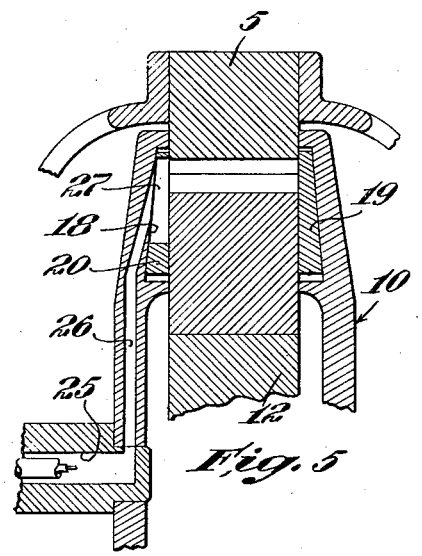
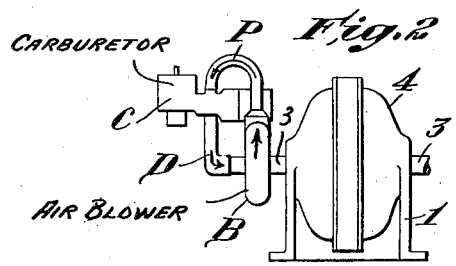
Inventor
Cyrus W. Haller
by Roberts, Cushman & Woodberry
attys.

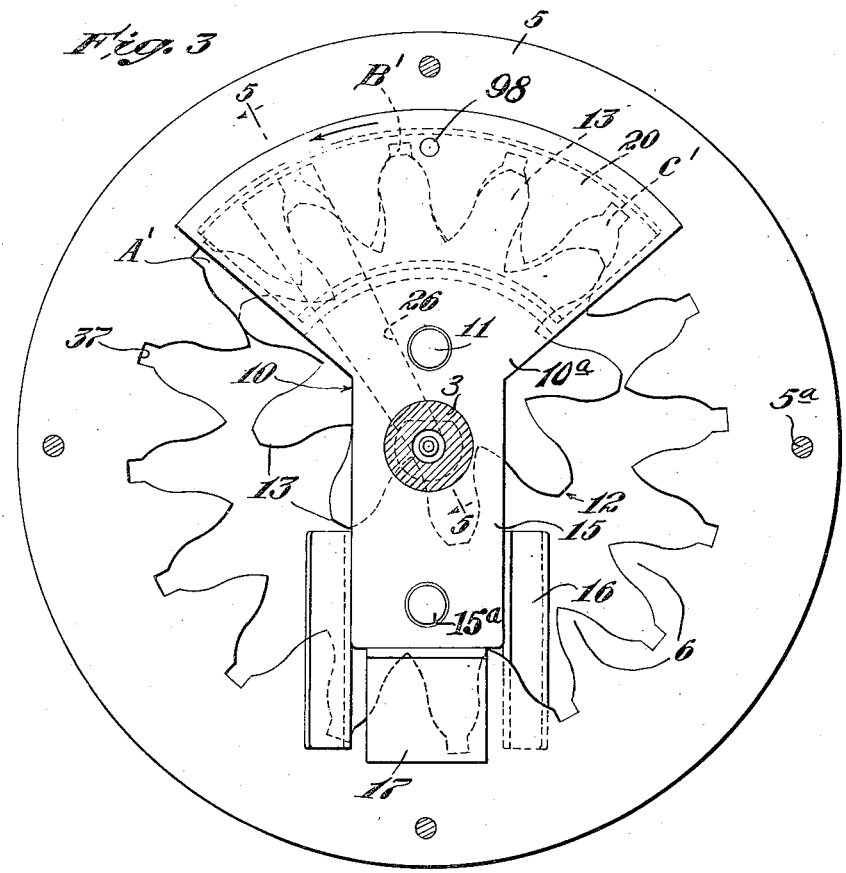
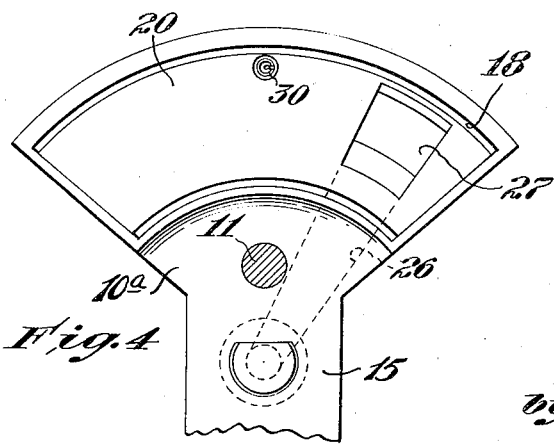

Patented Nov. 29, 1938

2,138,490

UNITED STATES PATENT OFFICE 2,138,490

ROTARY INTERNAL COMBUSTION ENGINE

Cyrus W. Haller, Marblehead, Mass.

Substitute for application Serial No. 2,881, January 22, 1935. This application August 14, 1937, Serial No. 159,170

11 Claims. (Cl. 123—12)

This invention relates to an improved fluid pressure apparatus, such as an internal combustion engine of the type wherein true rotary motion of the working parts is depended upon to compress the air or combustible mixture and to have motion imparted thereto as a result of combustion and expansion of the gases. The present application is a substitute for my application Serial No. 2,881, filed January 22, 1935. More particularly the present invention affords an engine wherein relative movement between toothed members results in the compression of gas, such as air or air mixed with a combustible medium, in a succession of contracting pockets. When each pocket reaches the region of minimum capacity, combustion may occur and the expansive force of the burning gases causes the relative movement of the toothed members as the pockets increase in size.

Preferably the toothed members may each be provided with teeth of the cycloidal type having contours such as are ordinarily employed in gears, but being arranged so that there is no backlash; accordingly as the teeth move into mesh a tooth upon one member will engage teeth upon either side so that a pocket is defined. In order to complete the pocket, suitable closure members or plates may be arranged at the ends of the teeth.

Preferably one of the toothed members is in the general form of an internally toothed annulus, while the other member may be in the form of a pinion. In order to permit the pockets to have adequate volume even in their region of minimum capacity, the spaces between the teeth may be undercut or the ends of the teeth may be cut away a proper amount to afford the desired compression ratio. Obviously the extent of undercutting may be varied so that an ordinary compression ratio may be employed with suitable ignition means or a high compression ratio may be afforded to cause spontaneous ignition according to the Diesel principle.

Either the annular member or the pinion may be mounted upon a fixed axial support, while the other member may be rotatable. Suitable means may be provided to afford an effective seal to prevent leakage of gas at the ends of the pockets, and obviously leakage between successive pockets is prevented by the contact of the teeth at both sides of the pocket, it being noted, however, that pressure differentials between successive pockets may be relatively small.

A motor of this type may be very simple, since the valve means employed may be incorporated very readily in the motor without necessity for separate moving valve parts or the like. Furthermore, a motor of this type may be readily cooled by air, thus further enhancing its simplicity. To this end a portion of the area about the ends of the teeth which are not in mesh may be open to the air and means may be arranged to direct a draft of air over and between these teeth, thus cooling the metal of both the annular member and the pinion. In the preferred embodiment of this invention blower elements or blades may be associated with a counterweight, which is arranged to counterbalance the pinion so that the motor may be perfectly balanced and free from vibration.

A further important characteristic of the motor is the arrangement of the parts so that an unusually ample "breathing" capacity is afforded and its volumetric efficiency may be high. If desired, air or a mixture of air with a combustible vapor or gas may be directed into both ends of the contracting pockets; also a motor of this type readily permits the employment of dual ignition.

Due to the arrangement of the parts of such a motor, special ignition timing means are not necessary and a simple, vibratory, make-and-break mechanism may be employed to afford a constant succession of ignition sparks in the region of minimum pocket capacity.

In the accompanying drawings,

Fig. 1 is a vertical section through a motor embodying the principles of this invention;

Fig. 2 is a small elevational detail of such a motor with certain of its accessories;

Fig. 3 is a side elevation of the principal parts of the motor shown in Fig. 1, certain supporting elements being removed and shown in section;

Fig. 4 is a section indicated by line 4—4 of Fig. 1; and

Fig. 5 is a section on line 5—5 of Fig. 3.

In the accompanying drawings, the numeral 1 designates the standards of a fixed frame, which includes journal boxes 2 supporting main shafts 3. Radial arms 4 extend from the fixed portions of the boxes 2 to support an annular member 5, which, as shown in Fig. 3, is provided with internal teeth 6. These teeth preferably are not truncated, but extend to relatively pointed ends. Such teeth preferably are of cycloidal form and are provided with a contour such as is conventionally employed in generating gear teeth, portions thereof being laid out by the employment of epicycloidal and hypocycloidal curves in a well known manner.

Disposed between the arms 4 at opposite sides of the motor is a rotary frame or support 10 which is provided with an axial member or shaft 11 disposed eccentrically in relation to the main shafts 3. A pinion 12 is rotatably mounted upon the shaft 11 and is provided with teeth 13 suitably shaped to mesh with the teeth 6 of the annular member 5 without any appreciable backlash. Opposite the shaft 11 and pinion 12, the frame 10 is extended to provide a counterweight portion 15 and a support for blades 16 and wipers 17 which are arranged to direct air into the space between the teeth of the pinion and annular member which are out of mesh. The frame 10 may include plates 10$^a$ having a connecting bar 15$^a$ extending between their counterweight portions 15.

The plates 10$^a$ are juxtaposed to the ends of the teeth 6 and 13 in their region of contact, and in order to afford effective gas sealing means, I may provide tapered recesses or compartments 18 which have their larger ends disposed nearer the main shafts 3. Suitable wedge-like elements or sealing members 19 and 20 are disposed within these tapered recesses and normally tend to be forced toward the smaller ends thereof by centrifugal force, the tapered outer wall of the recesses tending to press the elements 19 and 20 inwardly against the ends of the gear teeth to afford a seal. One main shaft 3 may be provided with a bore 25 which may communicate with a passage 26 in the frame 10, that in turn communicates with an opening 27 in the element 20. Thus air or a combustible mixture may be fed to the pockets as they move toward their contracting positions. Obviously, if desired, similar bores and passages may be provided at both sides of the engine.

In order to supply air to the bore 25, a blower B (Fig. 2) may be associated with one of the shafts 3, being arranged to supply a blast of air through pipe P to a carburetor C. From the carburetor the combustible mixture may flow through a duct D which communicates with the open end of the shaft 3. Thus a combustible mixture, which is under a positive pressure, is supplied to the motor.

A spark plug 30 may be arranged with its points disposed in an opening in plate 20 which communicates with the pockets between the teeth at their region of minimum capacity. An internally threaded opening 98, Fig. 3, is provided in the support 10 for the mounting of the spark-plug 30. The cable 31 for this spark plug may extend downwardly to a suitable duct 34 disposed within the bore 25 of shaft 3. This cable may be connected to any suitable make-and-break system (not shown) which is effective in causing a rapid succession of sparks. Obviously a similar plug may readily be arranged at the opposite side of the motor if dual ignition is desired.

Preferably the spaces between the teeth 6 may be undercut, as designated by numeral 37, Fig. 3, thus providing continuous recesses extending the full width of the teeth, in order to afford additional capacity for the pockets where combustion takes place. Obviously the amount of the undercutting determines the minimum capacity of the pockets, and therefore the compression ratio can be widely varied in accordance with the extent of undercutting. It is evident, however, that the teeth may be truncated to afford similar results.

In the operation of a motor of this character, the shaft 3 may be set in rotation by any suitable starter (not shown), or by hand cranking. As successive teeth 13 of the pinion 12 move into mesh with the teeth 6 of the annular member, air is entrapped in the relatively large pockets between the teeth. Thus a relatively large body of air may first be enclosed in this manner, as for example by a pocket moving away from the position designated A' in Fig. 3, it being obvious that when the ends of the pockets are uncovered atmospheric air can readily enter the same. Thereupon as the teeth move into closer mesh, the air or combustible gas is compressed until the region of minimum capacity is approached, as in the case of the pocket designated B'. As the pocket continues its movement it reaches the point of ignition, whereupon combustion occurs and the expansive tendency of the gases is effective in pushing the teeth apart, thus causing continued relative movement of the pinion and annular member and consequent rotation of the main shaft 3. Expansion may be continued until the pocket has a relatively large capacity and until the teeth have nearly moved out of mesh, as in the case of the pocket designated C' in Fig. 3, whereupon the ends of the pocket approach the edges of the plates 10$^a$, and the pocket is opened to the air and exhausting of the gases occurs. Thereupon as the teeth continue their movement, they are separated from each other and are exposed to the air. As they approach the counterbalancing portion 15 of the rotary support 10, the blades 16 are effective in subjecting the teeth 13, which have already cooled somewhat, to the effect of the blast of cooling air. Since the entire support 10 rotates about the shafts 3, the teeth 6 of the members are successively exposed to the heat of combustion and cooled by the blades 16. The large masses of metal about the ends of the pockets aid adequate cooling and avoid danger of warping due to heat.

Lubricant can be supplied to the moving parts by being mixed with the fuel or through suitable oil supply ducts. It is evident that it is desirable to design the pinion so that it may have the maximum size in relation to the annular member to permit the motor to have a large volumetric capacity in relation to its weight, such method of design being well known in the gear making art.

It is furthermore evident that all of the inherent features of this invention may be employed by providing a fixed mounting for the pinion and by rotating the annular member. In other words, the essential operation of the motor is only dependent upon the relative movement of the pinion and annular member. Obviously if the volume of the spaces provided by the undercut portions of the annular member are reduced, sufficient compression may be provided to permit the motor to run on the Diesel principle so that the ignition means may be omitted and a conventional Diesel type of fuel injector employed.

It is evident that the present invention affords a simple, light weight, internal combustion engine having the advantages of true rotary motion and permitting perfect dynamic balance and thus facilitating high speeds, while permitting a rapid succession of small explosions so that smooth operation is assured. It is furthermore evident that a motor of this character is particularly adapted to air cooling.

I claim:

1. Apparatus of the class described comprising an internally toothed annular member, a pinion member having teeth meshing with the teeth of the annular member, a support upon which the pinion member is rotatably mounted in eccentric relation to the annular member, a connection between the support and annular member permitting relative rotary movement between said support and said member, the teeth of said members being shaped to define successive pockets during said relative movement so that said pockets move through a region of minimum volume, said support being arranged to close the ends of said pockets, and means associated with the support to introduce a combustible gas into the ends of said pockets, and ignition means including a spark plug mounted on said support near the region of minimum pocket volume.

2. Apparatus of the class described comprising an internally toothed annular member, a pinion member having teeth meshing with the teeth of the annular member, a support upon which the pinion member is rotatably mounted in eccentric relation to the annular member, a connection between the support and annular member permitting relative rotary movement therebetween, the teeth of said members being of the cycloidal type and shaped to define successive pockets during said relative movement, said support being arranged to close the ends of said pockets, and means associated with the support to introduce a combustible gas into the ends of said pockets, one of said members being provided with continuous undercut recesses between the roots of its teeth whereby the minimum volume of the pockets is increased.

3. Apparatus of the class described comprising an internally toothed annular member, a pinion member having teeth meshing with the teeth of the annular member, a support upon which the pinion member is rotatably mounted in eccentric relation to the annular member, a connection between the support and annular member permitting relative rotary movement therebetween, the teeth of said members being of the cycloidal type and meshing to define successive contracting and expanding pockets, so that said pockets move through a region of minimum volume, said support being arranged to close the ends of said pockets, and means associated with the support to introduce a combustible gas into the ends of said pockets.

4. Apparatus of the class described comprising an internally toothed annular member, a frame supporting said member, a pinion member having teeth meshing with the teeth of the annular member to define a series of pockets, a support upon which the pinion is rotatably mounted in eccentric relation to the annular member, a rotatable shaft concentric with the annular member, said support being fixed to said shaft to rotate therewith and having portions to close the ends of the pockets, said support also having counterbalancing portions diametrically disposed in relation to said first-named portions.

5. Apparatus of the class described comprising an internally toothed annular member, a frame supporting said member, a pinion member having teeth meshing with the teeth of the annular member to define a series of pockets, a support upon which the pinion is rotatably mounted in eccentric relation to the annular member, a rotatable shaft concentric with the annular member, said support being fixed to said shaft to rotate therewith and having portions to close the ends of the pockets, the support being formed so that a part of the space between the pinion and annular member is uncovered to permit cooling of the teeth which are out of mesh.

6. Apparatus of the class described comprising an internally toothed annular member, a frame supporting said member, a pinion member having teeth meshing with the teeth of the annular member to define a series of pockets, a support upon which the pinion is rotatably mounted in eccentric relation to the annular member, a rotatable shaft concentric with the annular member, said support being fixed to said shaft to rotate therewith and having portions to close the ends of the pockets, said support also having counterbalancing portions diametrically disposed in relation to said first-named portions, the support being formed so that a part of the space between the pinion and annular member is uncovered to permit cooling of the teeth which are out of mesh, and blades supported by the counterbalancing portions of said support to induce the flow of air through said space.

7. Apparatus of the class described comprising an internally toothed annular member, a frame supporting said member, a pinion member having teeth meshing with the teeth of the annular member to define a series of pockets, a support upon which the pinion is rotatably mounted in eccentric relation to the annular member, a rotatable shaft concentric with the annular member, said support being fixed to said shaft to rotate therewith and having portions to close the ends of the pockets, said portions having recesses with outer walls inclined inwardly toward the annular member, and sealing members in said recesses having inclined faces engaging said walls whereby said members are yieldably urged inwardly against the ends of the teeth due to the action of centrifugal force.

8. Apparatus of the class described comprising an internally toothed annular member, a pinion member having teeth meshing with the teeth of the annular member, said members having teeth of the cycloidal type meshing without substantial backlash, a support upon which the pinion member is rotatably mounted in eccentric relation to the annular member, a connection between the support and annular member permitting relative rotary movement therebetween, the teeth of said members being shaped to define successive pockets during said relative movement, said support being arranged to close the ends of said pockets, said annular member, pinion member and support cooperating in providing compartments which are tapered radially outward, means to introduce fluid into said pockets, and tapered sealing elements fitting within said compartments and yieldably pressed against the ends of the teeth by the action of centrifugal force and due to the tapered shape of said compartments.

9. Apparatus of the class described comprising an internally toothed annular member, a pinion member having teeth meshing with the teeth of the annular member, a support upon which the pinion member is rotatably mounted, connecting means between the support and annular member defining a major axis for relative rotation of the support and annular member, the pinion member being rotatable about a secondary axis which is eccentric to said major axis, the teeth of said members being shaped to define successive pockets during said relative rotation so that said pockets move through a region of minimum volume, said support having portions extending outwardly from the major axis and closing the opposite ends of said pockets, said connecting means providing a passage in the region of the major axis for a combustible gas, the support providing a substantially radially disposed continuation of said passage with a port to supply the combustible gas to the pockets as they are successively approaching the region of minimum volume, a portion of said support having edges spaced from the annular member and pinion to provide an opening for air to cool the teeth when they are out of mesh.

10. Apparatus of the class described comprising an internally toothed annular member, a pinion member having teeth meshing with the teeth of the annular member, a support upon which the pinion member is rotatably mounted, connecting means between the support and annular member defining a major axis for relative rotation of the support and annular member, the pinion member being rotatable about a secondary axis which is eccentric to said axis, the teeth of said members being shaped to define successive pockets during said relative rotation so that said pockets move through a region of minimum volume, said support having portions extending outwardly from the major axis and closing the opposite ends of said pockets, said support having a shaft extending between said portions to define the secondary axis, and means associated with the support to introduce a combustible gas into the ends of the pockets as they are approaching the region of minimum volume.

11. Apparatus of the class described comprising an internally toothed annular member, a pinion member having teeth meshing with the teeth of the annular member, a support upon which the pinion member is rotatably mounted, connecting means between the support and annular member defining a major axis for relative rotation of the support and annular member, the pinion member being rotatable about a secondary axis which is eccentric to said major axis, the teeth of said members being shaped to define successive pockets during said relative rotation so that said pockets move through a region of minimum volume, said support having portions extending outwardly from the major axis and closing the opposite ends of said pockets, said support having a shaft extending between said portions to define the secondary axis, the support also providing a passage and a port to introduce a combustible gas into one end of each pocket as it is approaching the region of minimum volume.

CYRUS W. HALLER.